US012158286B2

(12) United States Patent
Sprygada et al.

(10) Patent No.: US 12,158,286 B2
(45) Date of Patent: Dec. 3, 2024

(54) FLOW HEATER

(71) Applicant: BorgWarner Ludwigsburg GmbH, Ludwigsburg (DE)

(72) Inventors: Benjamin Sprygada, Battle Creek, MI (US); Timo Stifel, Freiberg am Neckar (DE); Andreas Rothoff, Markdorf (DE); Matthias Grünewald, Ludwigsburg (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 568 days.

(21) Appl. No.: 17/099,485

(22) Filed: Nov. 16, 2020

(65) Prior Publication Data

US 2021/0148603 A1 May 20, 2021

Related U.S. Application Data

(60) Provisional application No. 62/937,052, filed on Nov. 18, 2019.

(51) Int. Cl.

| | |
|---|---|
| ***F24H 1/00*** | (2022.01) |
| ***F24H 1/10*** | (2022.01) |
| ***F24H 9/00*** | (2022.01) |
| ***H05B 1/02*** | (2006.01) |
| ***H05B 3/22*** | (2006.01) |

(52) U.S. Cl.

CPC ............. *F24H 1/102* (2013.01); *F24H 1/009* (2013.01); *F24H 9/0015* (2013.01); *H05B 3/22* (2013.01); *H05B 1/0236* (2013.01)

(58) Field of Classification Search

CPC .......................... F24H 1/121; H05B 2203/023

See application file for complete search history.

(56) References Cited

U.S. PATENT DOCUMENTS

| | | | | |
|---|---|---|---|---|
| 4,508,957 | A * | 4/1985 | Rocchitelli | B60S 1/488 392/479 |
| 5,471,034 | A * | 11/1995 | Kawate | H05B 3/141 219/505 |
| 5,995,711 | A * | 11/1999 | Fukuoka | B60H 1/00328 219/202 |
| 9,091,457 | B2 * | 7/2015 | King | F24H 9/001 |
| 9,291,362 | B2 * | 3/2016 | Bohlender | F24H 3/062 |
| 10,889,164 | B2 * | 1/2021 | McCarthy | F24H 9/1827 |
| 10,895,403 | B2 * | 1/2021 | Hermida Domínguez | F24H 1/142 |
| 2004/0264951 | A1 | 12/2004 | Kuebler et al. | |

(Continued)

FOREIGN PATENT DOCUMENTS

| | | | |
|---|---|---|---|
| CN | 104272054 | A | 1/2015 |
| CN | 107791788 | A | 3/2018 |

(Continued)

*Primary Examiner* — Dana Ross
*Assistant Examiner* — Lawrence H Samuels
(74) *Attorney, Agent, or Firm* — Bose McKinney & Evans LLP

(57) ABSTRACT

Disclosed is a flow heater with a housing having an inlet opening and an outlet opening, a heating plate delimiting a flow path for fluid to be heated to flow from the inlet opening to the outlet opening, and a flow guidance plate that is arranged inside the housing, the flow guidance plate extending along the heating plate at a distance from it thereby delimiting the flow path.

9 Claims, 3 Drawing Sheets

(56) References Cited

U.S. PATENT DOCUMENTS

2009/0314764 A1* 12/2009 Mori ........................ H05B 3/50 219/520
2011/0062137 A1* 3/2011 Wu ......................... F24H 1/009 219/202
2012/0267355 A1* 10/2012 Trapp ..................... H05B 3/265 219/202
2013/0026151 A1* 1/2013 Adachi ................. F24H 3/0429 219/202
2013/0163969 A1* 6/2013 Bohlender .............. F24H 3/062 392/465
2014/0355965 A1* 12/2014 Ritzhaupt ............. F24H 9/1872 392/347
2015/0090802 A1 4/2015 Eckert et al.
2015/0343883 A1* 12/2015 Gu ........................ F24H 9/1872 392/347
2017/0138633 A1* 5/2017 Hermida Domínguez .................. F24H 1/142
2018/0015805 A1* 1/2018 Gschwind ................ B60H 1/14
2018/0065447 A1 3/2018 Cmelik et al.
2018/0186215 A1* 7/2018 Ogasawara ........... F24H 9/2028
2019/0077224 A1* 3/2019 McCarthy ............... F24H 1/121
2020/0009943 A1 1/2020 Baecker et al.
2020/0062082 A1* 2/2020 Hermida Domínguez .................. H05B 1/0236
2020/0269657 A1* 8/2020 Kim ........................ F24H 1/162
2020/0398634 A1* 12/2020 Cheadle .................. F24H 1/009

FOREIGN PATENT DOCUMENTS

CN 109506358 A 3/2019
CN 110291344 A 9/2019
KR 20190054343 A 5/2019

* cited by examiner

FLOW HEATER

RELATED APPLICATIONS

This application claims priority to U.S. Provisional Patent Application No. 62/937,052, filed Nov. 18, 2019, the entire disclosure of which is hereby incorporated herein by reference.

BACKGROUND

This disclosure relates to an electric flow heater, especially a flow heater for heating water or water-based fluids in a vehicle.

Heaters for automotive applications have to fulfill several requirements. They have to be compact because space is very limited in cars, have to satisfy increasing demands on heating power such that the flow heater can be used for quick heating of the passenger cabin in cold weather conditions, and must be cost efficient to manufacture. The limited space in cars often causes automotive manufacturers to specify where the inlet and outlet ports of a flow heater have to be arranged. The arrangement of inlet and outlets ports affects the flow path along which liquid to be heated flows inside the flow heater from the inlet port to the outlet port.

SUMMARY

This disclosure shows how a compact flow heater can be manufactured cost efficiently that can efficiently employ large heating power.

The flow heater according to this disclosure comprises a housing, a heating plate, and a flow guidance plate. The heating plate and the flow guidance plate are arranged such that they limit a flow path along which fluid to be heated flows from an inlet opening to an outlet opening of the housing. The flow guidance plate extends along the heating plate at a distance from it and thereby defines a passage through which liquid flows to be heated. Thus, a section of the flow path is limited on one side by the heating plate and on an opposite side by the flow guidance plate. The heating plate can therefore transfer heat efficiently to liquid flowing along the flow path.

The housing may be a cast housing or a housing made by deep drawing as such housings can be produced cost efficiently, but only if their shape is not too complicated. If the inlet opening and the outlet opening are rather close to each other it is usually difficult to ensure a flow path that uses the volume of the water heater efficiently and leads along the heating plate. In a flow heater according to this disclosure, the flow guidance plate can guide the flow path along the heating plate even if the shape of the house is simple and the inlet opening rather close to the outlet opening.

A refinement of this disclosure provides that the flow guidance plate has an upper side facing the heating plate and a lower side opposite to the upper side, wherein the flow guidance plate is arranged inside the housing such that the flow path extends also along a section of the lower side. This can achieved, e.g., in that the housing comprises a wall to which the lower side of the flow guidance plate is connected, either fixed or free-floating. Liquid to be heated can thereby be prevented from flowing directly from the inlet to the outlet. Rather liquid has to flow along at least one section of the lower side and along the upper side of the flow guidance plate. Thus, the total length of the flow path extending along the heating plate can be made much larger than the distance between the inlet and the outlet opening.

Another refinement of this disclosure provides that both lateral edges of the flow guidance plate are connected in a fluid tight manner to the housing, e.g., by welding. Thereby it can be ensured that all liquid to be heated flows along the flow path and thereby along the heating plate. In other embodiments, it might be beneficial to have some leakage around lateral edges of the flow guidance plate.

Another refinement of this disclosure provides that the flow guidance plate is connected via fins to a heating plate. Thereby heat transfer from the heating plate to liquid to be heated can be improved. The fins may be corrugated sheet metal for example. The fins may be connected to the fins and/or the heating plate by welding, soldering or an adhesive, for example. The heating plate may be a substrate, e.g., a metal sheet, carrying resistive tracks as heating resistors.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
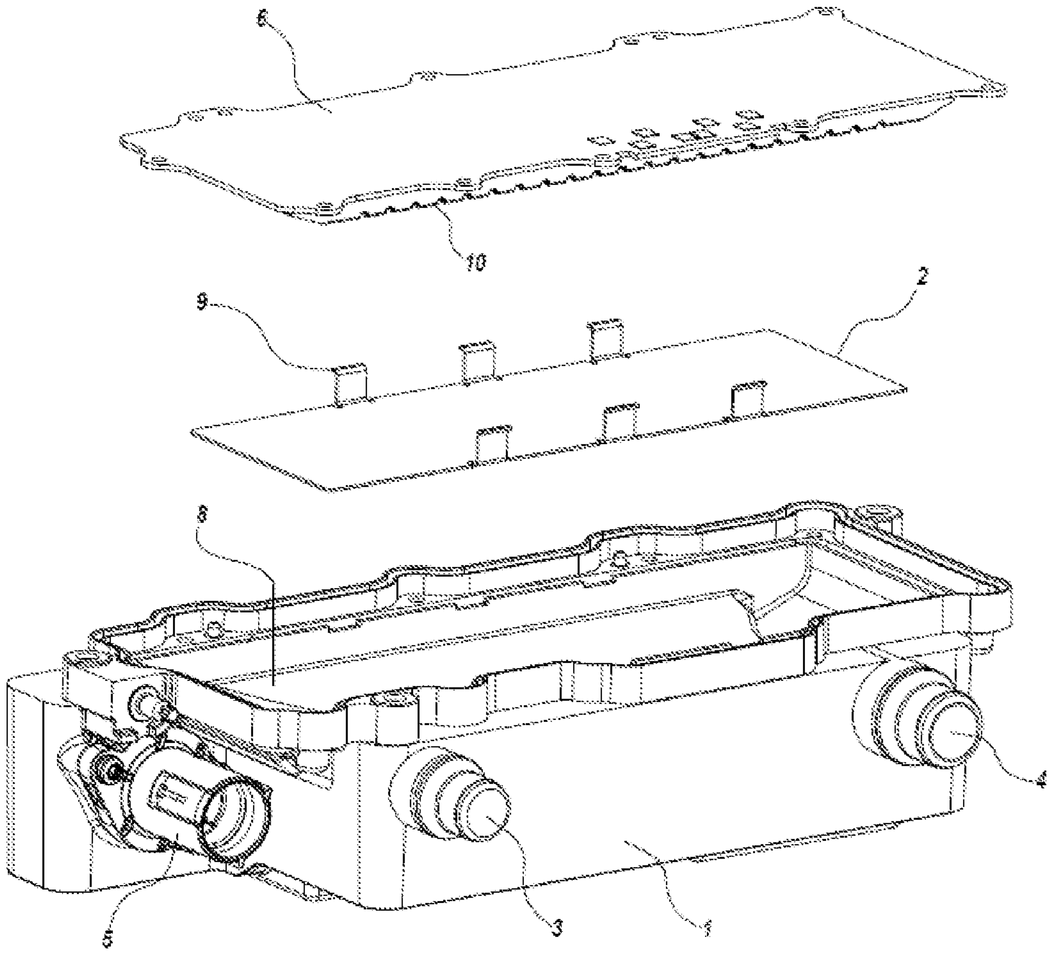
FIG. 1 shows the housing and a flow guidance plate of an embodiment of a flow heater.

In FIG. 1, a housing 1 of an embodiment of an electric flow heater is shown together with a flow guidance plate 2, but without a cover. The housing 1 may be a cast housing, i.e., a housing that was made by casting, or made by deep drawing. The housing may be made of metal, e.g., an aluminum alloy. The housing 1 has an inlet opening 3 and an outlet opening 4, which may be provided with integrated or separate pressed-in spigots for facilitating connections to conduits as shown in FIG. 1. The housing 1 is also provided with electrical connectors 5. In other embodiments, electrical connectors may also be attached to a housing cover.

Inside the housing 1 are an inlet region 3*a* and an outlet region 4*a* which are separated by a wall 8. This wall may be integral to the housing 1, integral to the flow guidance plate 2 or a separate part. The flow guidance plate 2 sits on this wall 8 and may be attached to it in a fluid tight manner, e.g., by welding, or might simply be connected to the housing 1 by an interference fit.

Figure 2:
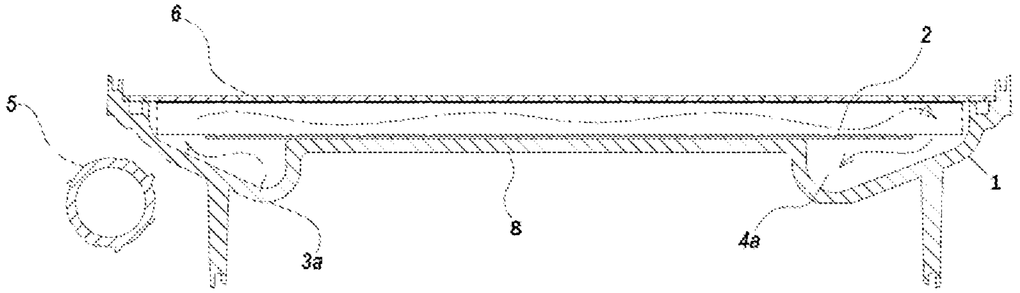
FIG. 2 shows a cross section of the flow heater.

FIG. 2 shows a cross section of a flow heater comprising the housing 1, the flow guidance plate 2, and a heating plate 6. The heating plate 6 may be provided as a substrate, e.g., a sheet of steel or some other metal, carrying conductor tracks for resistance heating. The conductor tracks are usually arranged on a dry side of the heating plate 6, i.e., the side facing away from the flow path. Liquid to be heated flows from the inlet opening 3 to the outlet opening 4 along a flow path that is indicated in FIG. 2 by arrows. In the embodiment shown, the flow guidance plate 2 is arranged parallel to the heating plate 6. In this context "generally parallel" means that the arrangement may deviate from a parallel arrangement by manufacturing tolerances. In other embodiments, the flow guidance plate may be slanted, e.g., to create a conical flow where the channel cross section becomes smaller or larger when it comes closer to the outlet. The edges of the flow guidance plate could also be bent up or downwards to achieve a certain pressure drop improvement.

In the embodiment shown in FIG. 2, liquid flows inside the housing 1 from inlet region 3*a* along a section of the flow path delimited by the housing 1 and the flow guidance plate 2, then along a section of the flow path delimited by the heating plate 2 on one side and by the flow guidance plate 2 on an opposite side. The final section of the flow path is then in the outlet region 4*a* and delimited by the housing 1 and the flow guidance plate 2. Thus, the flow path extends for a larger distance along the heating plate 6 than the distance between the inlet opening 3 and the outlet opening 4. The position of the inlet and outlet openings 3, 4 does not affect the section of the flow path than extends along the heating plate 6.

In other embodiments, the flow guidance plate may have a large opening or window where it contacts the housing or there may be two separate flow guidance plates arranged at a distance from each other. Then liquid may flow inside the housing from an inlet region along a section of the flow path delimited on opposite sides by the housing.

The flow guidance plate 2 may be provided with tabs 9, e.g., to facilitate positioning of the flow guidance plate 2 in the housing 1 or fixation, especially by clamping. After positioning, the flow guidance plate 2 may be welded to the housing 1. A lower side of the flow guidance plate 2 may be welded to wall 8 and lateral edges of the flow guidance plate 2 may also be welded to the housing 1.

The flow guidance plate 2 has an upper side facing the heating plate 6 and a lower side opposite to the upper side. As shown in FIG. 2, the flow guidance plate 2 is arranged inside the cast housing 1 such that the flow path extends also along section of the lower side, namely in the inlet and outlet regions 3*a*, 4*a*.

Figure 3:
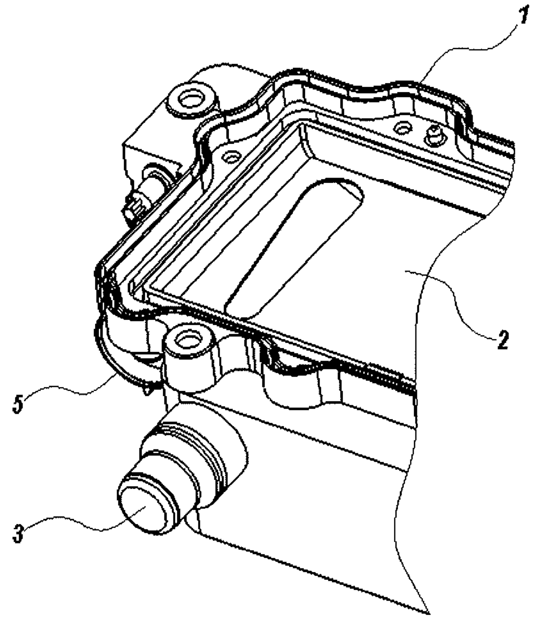
FIG. 3 shows the housing and a flow guidance plate of another embodiment of a flow heater.

In FIG. 3, another embodiment of a flow heater is shown without cover. This embodiment differs from the embodiment of FIG. 1 mainly in that the flow guidance plate 2 comprises openings through which the flow path extends. The flow guidance plate 2 may than be connected along its entire rim to the housing 1. The shape of the openings can be adapted to create a specific flow characteristic.

Figure 4:
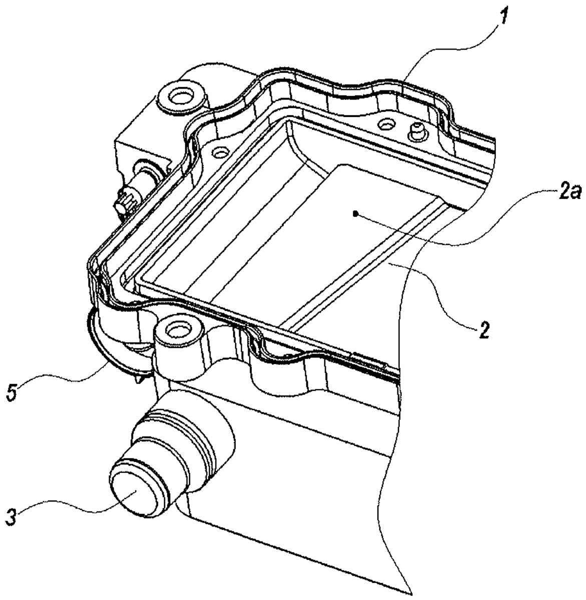
FIG. 4 shows the housing and a flow guidance plate of another embodiment of a flow heater.
Figure 5:
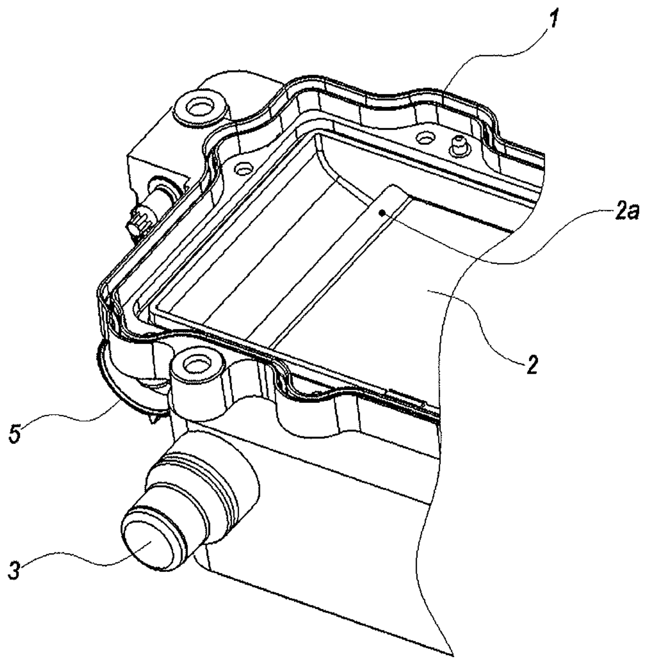
FIG. 5 shows the housing and a flow guidance plate of another embodiment of a flow heater.

FIGS. 4 and 5 show details of another flow heater without cover. In these embodiments the flow guidance plate 2 does not merely provide a flat surface delimiting the flow channel, but comprises raised structures 2*a*, e.g., steps, in order to influence fluid dynamics inside the flow channel.

Figure 6:
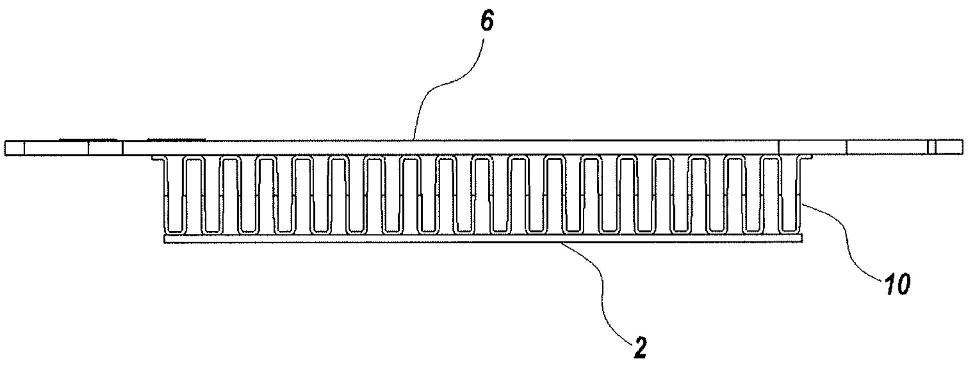
FIG. 6 shows an embodiment of a flow guidance plate to fins for thermal transfer.

FIG. 6 shows an embodiment of a flow guidance plate 2 with fins 10 attached to it, e.g., by soldering, welding or by means of an adhesive. The fins 10 may be used to connect the flow guidance plate thermally to a heating plate 6 and thereby facilitate the transfer of heat from a heating plate to liquid.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

| REFERENCE NUMERALS | |
|---|---|
| 1 | Housing |
| 2 | Flow guidance plate |
| 2a | Raised structure |
| 3 | Inlet |
| 3a | Inlet region |
| 4 | Outlet |
| 4a | Outlet region |
| 5 | Connector |
| 6 | Heating plate |
| 8 | Wall |
| 9 | Tabs |
| 10 | Fins |

What is claimed is:

1. A flow heater, comprising:

a housing having an inlet opening and an outlet opening;

a flow path along which fluid is configured to flow extending between the inlet opening and the outlet opening;

a heating plate delimiting a first portion of the flow path for fluid to be heated; and a flow guidance plate arranged inside the housing, the flow guidance plate extending along and spaced from the heating plate to thereby delimit a second portion of the flow path;

wherein the flow guidance plate has an upper side facing the heating plate and a lower side opposite the upper side, wherein the flow guidance plate is arranged inside the housing such that the flow path extends from the inlet opening along a first section of the flow path defined by the lower side of the flow guidance plate and the housing, to a second section of the flow path extending between the heating plate and the upper side of the flow guidance plate, to a final section of the flow path in communication with the outlet and defined by the lower side of the flow guidance plate and the housing wherein the first section of the flow path and the final section of the flow path are arranged on opposite ends of the flow guidance plate; and wherein all liquid entering the housing through the inlet opening flows sequentially from the inlet opening to the first section, to the second section, to the final section and then to the outlet opening.

2. The flow heater according to claim 1, wherein the heating plate comprises a sheet metal substrate carrying conductor tracks for resistance heating.

3. The flow heater according to claim 1, wherein the flow guidance plate comprises tabs for positioning of the flow guidance plate inside the housing.

4. The flow heater according to claim 1, wherein the housing is cast or deep drawn.

5. The flow heater according to claim 1, wherein the flow guidance plate is connected via fins to the heating plate.

6. The flow heater according to claim 1, wherein the second section of the flow path extending along the heating plate is longer than the distance between the inlet opening and the outlet opening.

7. A flow heater, comprising:

a housing having an inlet opening and an outlet opening;

a flow path along which fluid is configured to flow extending between the inlet opening and the outlet opening;

a heating plate delimiting a first portion of the flow path for fluid to be heated; and a flow guidance plate arranged inside the housing, the flow guidance plate extending along and spaced from the heating plate to thereby delimit a second portion of the flow path;

wherein the flow guidance plate has an upper side facing the heating plate and a lower side opposite the upper side, wherein the flow guidance plate is arranged inside the housing such that the flow path extends from the inlet opening along a first section of the flow path defined by the lower side of the flow guidance plate and the housing, to a second section of the flow path extending between the heating plate and the upper side of the flow guidance plate, to a final section of the flow path in communication with the outlet and defined by the lower side of the flow guidance plate and the housing wherein the first section of the flow path and the final section of the flow path are arranged on opposite ends of the flow guidance plate; and wherein the housing comprises a wall and the lower side of the flow guidance plate contacts the wall between the first section and final section of the flow path to thereby prevent liquid from flowing between the lower side of the flow guidance plate and the wall between the first section and the final section of the flow path.

8. The flow heater according to claim 7, wherein the flow guidance plate is welded to the wall.

9. A flow heater, comprising:

a housing having an inlet opening and an outlet opening;

a flow path along which fluid is configured to flow extending between the inlet opening and the outlet opening;

a heating plate delimiting a first portion of the flow path for fluid to be heated; and a flow guidance plate arranged inside the housing, the flow guidance plate extending along and spaced from the heating plate to thereby delimit a second portion of the flow path;

wherein the flow guidance plate has an upper side facing the heating plate and a lower side opposite the upper side, wherein the flow guidance plate is arranged inside the housing such that the flow path extends from the inlet opening along a first section of the flow path defined by the lower side of the flow guidance plate and the housing, to a second section of the flow path extending between the heating plate and the upper side of the flow guidance plate, to a final section of the flow path in communication with the outlet and defined by the lower side of the flow guidance plate and the housing wherein the first section of the flow path and the final section of the flow path are arranged on opposite ends of the flow guidance plate; and wherein the flow guidance plate has two lateral edges that are connected fluid tight to the housing and thereby prevents liquid from flowing between the lower side of the flow guidance plate and a wall of the housing between the first section and the final section of the flow path.

* * * * *